May 31, 1955  C. C. TIBBETS  2,709,418

STOCK WATERING TANK

Filed Feb. 8, 1954

Coyne C. Tibbets
INVENTOR.

United States Patent Office 2,709,418
Patented May 31, 1955

2,709,418

STOCK WATERING TANK

Coyne C. Tibbets, Clearmont, Wyo.

Application February 8, 1954, Serial No. 408,936

3 Claims. (Cl. 119—73)

This invention relates to a stock watering tank and more particularly to a device for use in cold climates with a reservoir, spring, creek, or other body of water, which is covered with a coating of ice to permit stock to gain access to the water of the reservoir or other body of water.

An object of this invention is to provide a stock watering tank which may be inserted through an opening in the ice to allow stock to gain access to the water within the tank.

A further object of this invention is to provide a stock watering tank for insertion through an opening in an ice coating on a reservoir and having heating means disposed within the tank for preventing the formation of an ice coating on the water within the tank.

A yet further object of this invention is to provide a stock watering tank having novel means thereon for supporting the same in position in a reservoir having a coating of ice thereon.

A still further object of this invention is to provide a stock watering tank which is simple in construction, and durable and lasting in use.

These together with other objects and advantages which will become subsequently apparent reside in the details of construction and operation as more fully hereinafter described and claimed, reference being had to the accompanying drawings forming a part hereof, and wherein like numerals refer to like parts throughout, and in which:

Figure 1:
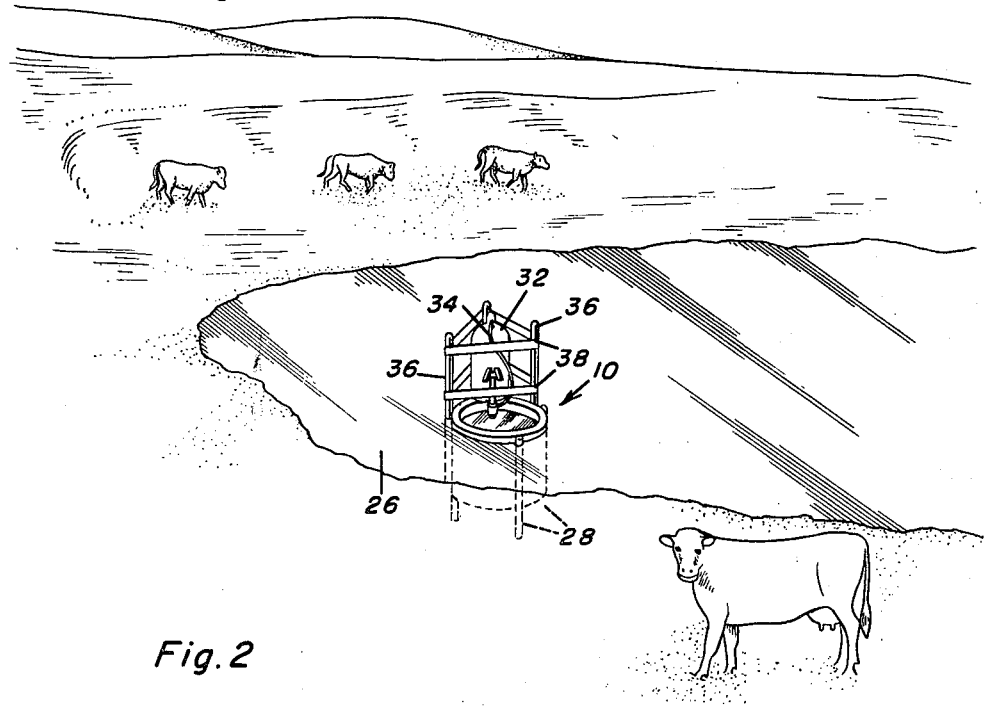
Figure 1 is a scenic view showing the improved stock watering tank mounted in position in a reservoir having an ice coating.
Figure 2:
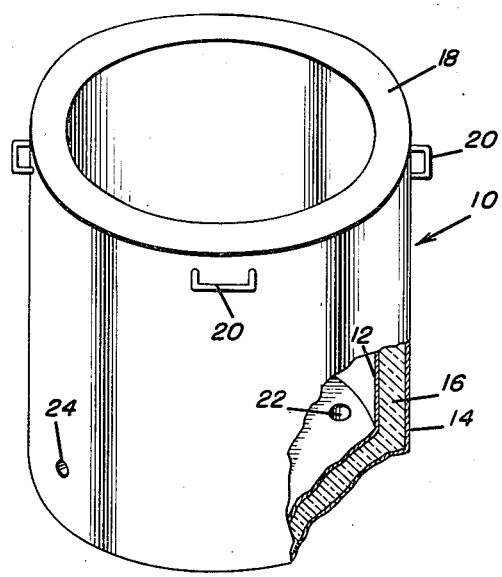
Figure 2 is a perspective view partly broken away showing the improved stock watering tank.
Figure 3:
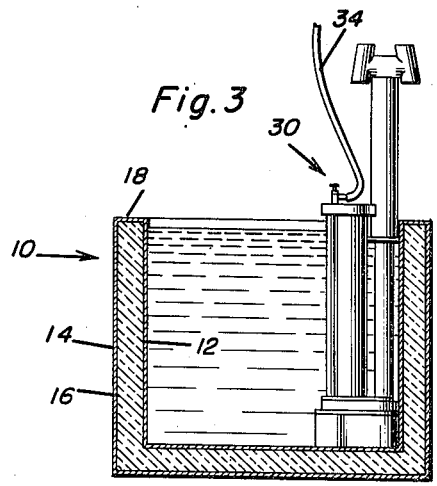
Figure 3 is a vertical sectional view of the improved stock watering tank and showing the heating means disposed therein.

Referring now more particularly to the accompanying drawings, it will be seen that the improved stock watering tank forming the subject of this invention includes a container 10 having side and bottom walls. The side and bottom walls are formed of inner and outer layers 12 and 14 of rigid material having a layer 16 of insulating material disposed therebetween. The upper edges of the inner and outer layers 12 and 14 are connected together by a ring 18 of similar material to enclose the insulating material therebetween.

A plurality of handles 20 are secured to the container 10 adjacent the top thereof in circumferentially spaced relationship. The handles 20 extend outwardly from the outer wall 14. An inlet 22 is provided in the bottom wall of the container and an inlet 24 is provided in the side wall of the container adjacent the bottom thereof. Either one or both of these inlets may be left open when the container is placed in position in a reservoir 26.

The handles 20 serve a twofold purpose. The first is that of providing a means whereby the container 10 may be lifted and transported to the site wherein the container is to be used. When the container 10 is placed in position a plurality of posts 28 may be secured at their upper end to the handles 20 in any conventional manner and will have their lower extremity extending below the bottom of the container 10 to rest upon the bottom of the reservoir 26 to support the container 10 in desired elevation.

A heater assembly 30 is adapted to be positioned within the container 10 to raise the temperature of the water therein a sufficient amount to prevent the formation of an ice coating on the water in the container during cold weather. A conventional gas container 32 is adapted to be connected by means of a conduit 34 to the heater assembly 30. In order to prevent the stock using the water tank from brushing against the portion of the heater extending above the container 10 and the gas container 30, a suitable enclosure is provided for enclosing the heater and the gas container 32. This enclosure comprises a plurality of posts 36 adapted to have the lower ends thereof embedded in the ice coating on the reservoir. A plurality of rails 38 extend between the posts 36 and are rigidly secured thereto in a manner so as to surround the heater assembly 30 and the container 32.

In practical use of the device, in cold weather, a reservoir or watering hole becomes coated with ice which will prevent the stock from having access to the water.

When the ice forms on the reservoir a hole is chopped through the ice and the posts 28 are attached to the handles 20 and the container 10 is inserted through the hole in the ice with the bottom of the posts 28 resting on the bed of the reservoir. Water from the reservoir will be allowed to enter through either or both of the apertures 22 and 24. This will fill the container 10. The heater assembly 30 is placed in position within the container 10 and the supply of gas 32 is connected to the heater. Suitable holes are chopped in the ice for inserting the lower ends of the posts 36. Then the rails 38 are attached to the posts to enclose the container 32 and the upper portion of the heater assembly 30. Subsequent freezing of the ice around the lower extremity of the posts 36 will lock the same in rigid position. The stock are then able to cross the frozen surface of the reservoir and drink the water from the container which is kept from freezing by the heater assembly 30.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For use with a reservoir subject to having an ice coating thereon, a stock watering tank, said tank comprising a container having side and bottom walls adapted to be positioned in an opening in an ice coating on a reservoir, inlets positioned remote from the top of said container permitting the flow of water from the reservoir into said container and a heater disposed in said container for preventing the formation of an ice coating on the water in said container, said container being provided with a plurality of circumferentially spaced handles secured thereto and forming supports therefor, a plurality of posts having the upper ends thereof secured to said handles, said posts extending below said container to rest upon the bed of a reservoir for supporting the container above the bed.

2. For use with a reservoir subject to having an ice coating thereon, a stock watering tank, said tank comprising a container having side and bottom walls adapted to be positioned in an opening in an ice coating on a reservoir, inlets positioned remote from the top of said container permitting the flow of water from the reservoir into said container, and a heater disposed in said container for preventing the formation of an ice coating on the water in said container, a fuel supply container operatively connected with said heater, and means enclosing said fuel container for preventing stock from brushing thereagainst.

3. For use with a reservoir subject to having an ice coating thereon, a stock watering tank, said tank comprising a container having side and bottom walls adapted to be positioned in an ice coating on a reservoir, inlets positioned remote from the top of said container permitting the flow of water from the reservoir into said container, and a heater disposed in said container for preventing the formation of an ice coating on the water in said container, a fuel supply container operatively connected with said heater, and means enclosing said fuel container for preventing stock from brushing thereagainst, said means comprising a plurality of posts adapted to be embedded in an ice coating and extend thereabove surrounding said fuel container, a plurality of rails extending between and secured to said posts, said fuel container being positioned within said posts and rails.

References Cited in the file of this patent

UNITED STATES PATENTS

| | | |
|---|---|---|
| 544,663 | Creque | Aug. 20, 1895 |
| 593,055 | Long | Nov. 2, 1897 |
| 1,474,530 | Kirby | Nov. 20, 1923 |
| 2,512,934 | Hancock | June 27, 1950 |